(12) United States Patent
Johnson et al.

(10) Patent No.: US 10,696,560 B2
(45) Date of Patent: Jun. 30, 2020

(54) SMALL CRYSTAL EMM-17, ITS METHOD OF MAKING AND USE

(71) Applicant: ExxonMobil Research and Engineering Company, Annandale, NJ (US)

(72) Inventors: Ivy D. Johnson, Lawrenceville, NJ (US); Nadya A. Hrycenko, Clinton, NJ (US); Theodore E. Datz, Easton, PA (US); William W. Lonergan, Humble, TX (US); Karl G. Strohmaier, Port Murray, NJ (US); Hilda B. Vroman, Piscataway, NJ (US); Keith C. Gallow, Kingwood, TX (US); Simon C. Weston, Annandale, NJ (US)

(73) Assignee: ExxonMobil Research & Engineering Company, Annandale, NJ (US)

(*) Notice: Subject to any disclaimer, the term of this patent is extended or adjusted under 35 U.S.C. 154(b) by 197 days.

(21) Appl. No.: 16/021,176

(22) Filed: Jun. 28, 2018

(65) Prior Publication Data
US 2019/0031518 A1    Jan. 31, 2019

Related U.S. Application Data

(60) Provisional application No. 62/537,704, filed on Jul. 27, 2017.

(51) Int. Cl.
| | | |
|---|---|---|
| C01B 39/48 | (2006.01) | |
| B01J 20/18 | (2006.01) | |
| B01J 29/70 | (2006.01) | |
| C10G 29/20 | (2006.01) | |
| C01B 37/02 | (2006.01) | |
| C10G 25/03 | (2006.01) | |

(Continued)

(52) U.S. Cl.
CPC ............ *C01B 39/48* (2013.01); *B01J 20/18* (2013.01); *B01J 29/40* (2013.01); *B01J 29/70* (2013.01); *C01B 37/007* (2013.01); *C01B 37/02* (2013.01); *C01B 39/08* (2013.01); *C10G 11/05* (2013.01); *C10G 25/03* (2013.01); *C10G 29/205* (2013.01); *C10G 47/16* (2013.01); *C01P 2002/72* (2013.01); *C01P 2004/62* (2013.01); *C01P 2006/12* (2013.01)

(58) Field of Classification Search
CPC .......... C01B 39/48; B01J 20/18; B01J 29/70; C10G 11/05; C10G 25/03; C01P 2002/72; C01P 2004/62; C01P 2006/12
See application file for complete search history.

(56) References Cited

U.S. PATENT DOCUMENTS

| | | |
|---|---|---|
| 4,391,785 A | 7/1983 | Rosinski et al. |
| 5,108,579 A | 4/1992 | Casci |

(Continued)

OTHER PUBLICATIONS

The International Search Report and Written Opinion of PCT/US2018/039899 dated Sep. 19, 2018.

(Continued)

*Primary Examiner* — David M Brunsman
(74) *Attorney, Agent, or Firm* — Priya G. Prasad

(57) ABSTRACT

A molecular sieve material, EMM-17, has in its as-calcined form, a total surface area of greater than 550 m²/g and/or an external surface area of greater than about 100 m²/g as measured by the BET Method, and a specific X-ray diffraction pattern.

23 Claims, 4 Drawing Sheets

(51) Int. Cl.
*C10G 47/16* (2006.01)
*C10G 11/05* (2006.01)
*C01B 37/00* (2006.01)
*C01B 39/08* (2006.01)
*B01J 29/40* (2006.01)

(56) References Cited

U.S. PATENT DOCUMENTS

| | | |
|---|---|---|
| 6,524,551 B2 | 2/2003 | Dhingra |
| 9,205,416 B2 * | 12/2015 | Burton .................... B01J 29/70 |
| 9,452,423 B2 * | 9/2016 | Weston ................. C01B 37/007 |
| 9,682,945 B2 * | 6/2017 | Burton .................... B01J 29/70 |
| 9,890,050 B2 * | 2/2018 | Weston ................. C01B 37/007 |
| 2015/0025291 A1 | 1/2015 | Weston et al. |

OTHER PUBLICATIONS

Muzzio et al., "Solids Mixing", In "Handbook of Industrial Mixing : Science and Practice", 2004, John Wiley & Sons.

* cited by examiner

SMALL CRYSTAL EMM-17, ITS METHOD OF MAKING AND USE

CROSS-REFERENCE TO RELATED APPLICATIONS

This application claims priority to U.S. Provisional Application Ser. No. 62/537,704 filed Jul. 27, 2017, which is herein incorporated by reference in its entirety.

FIELD

This invention relates to a molecular sieve material, designated as EMM-17, its synthesis and its use as an adsorbent and as a catalyst for hydrocarbon conversion reactions.

BACKGROUND

Molecular sieve materials, both natural and synthetic, have been demonstrated in the past to be useful as adsorbents and to have catalytic properties for various types of hydrocarbon conversion reactions. Certain molecular sieves, such as zeolites, AlPOs, and mesoporous materials, are ordered, porous crystalline materials having a definite crystalline structure as determined by X-ray diffraction (XRD). Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of positive ion-containing crystalline silicates. These silicates can be described as rigid three-dimensional framework of $SiO_4$ and Periodic Table Group 13 element oxide (e.g., $AlO_4$). The tetrahedra are cross-linked by the sharing of oxygen atoms with the electrovalence of the tetrahedra containing the Group 13 element (e.g., aluminum) being balanced by the inclusion in the crystal of a cation, for example a proton, an alkali metal or an alkaline earth metal cation. This can be expressed wherein the ratio of the Group 13 element (e.g., aluminum) to the number of various cations, such as $H^+$, $Ca^{2+}/2$, $Sr^{2+}/2$, $Na^+$, $K^+$, or $Li^+$, is equal to unity.

One crystalline molecular sieve useful for adsorption and certain hydrocarbon conversion processes is designated as EMM-17. Conventional static crystallization of an EMM-17 synthesis mixture produces large crystals in the 1-5 μm size range. Such large crystals inherently have slower diffusion. For chemical reactions where diffusivity is critical, having a smaller crystal size provides a shorter diffusion path and therefore, enhances the mass transfer, improving the desired reaction pathways with a positive impact on the selectivity and conversion of such reactions.

Therefore, there is a need for a crystalline molecular sieve, designated as EMM-17, which has a smaller crystal size and more uniform morphology. This invention meets this and other needs.

SUMMARY

A uniform, small crystal molecular sieve, designated as EMM-17, having a crystal size on the order of 0.1 to 1 μm in size with uniform morphology has been discovered. Such small crystal may be synthesized by modifying the preparation of the synthesis mixture and the mixer configuration used during crystallization as specified herein. Specifically, the use of a freeze dryer to prepare a synthesis mixture as a free-flowing powder and the use of a mixer operating under a cataracting mixing regime produced a uniform, small crystal EMM-17.

In a first aspect, the invention resides in a molecular sieve material, designated as EMM-17, having, in its as-calcined form, a total surface area of greater than about 550 $m^2/g$ and/or an external surface area of greater than about 100 $m^2/g$ as measured by the BET Method, and an X-ray diffraction pattern including the following peaks in Table 1:

TABLE 1

| d-spacing (Å) | Relative Intensity [100 × I/I(o)] % |
|---|---|
| 17.4-16.4 | 1-10 |
| 12.6-12.1 | 1-20 |
| 11.8-11.4 | 60-100 |
| 11.2-10.8 | 5-30 |
| 10.7-10.3 | 30-80 |
| 8.62-8.38 | 10-40 |
| 6.09-5.96 | 1-20 |
| 5.71-5.61 | 1-20 |
| 4.23-4.17 | 1-20 |
| 4.09-4.03 | 1-10 |
| 3.952-3.901 | 10-40 |
| 3.857-3.809 | 5-30 |
| 3.751-3.705 | 1-20 |
| 3.727-3.682 | 1-20 |
| 3.689-3.644 | 1-10 |
| 3.547-3.506 | 1-20 |

In some embodiments, the as-calcined molecular sieve material has a total surface area in the range from about 550 $m^2/g$ to about 900 $m^2/g$, or from about 600 $m^2/g$ to 800 $m^2/g$, and/or an external surface area in the range from greater than about 100 $m^2/g$, from about 100 $m^2/g$ to about 500 $m^2g$, or from about 250 $m^2/g$ to about 400 $m^2/g$. In a particular embodiment, the as-calcined molecular sieve has both a total surface area in the range from about 550 $m^2/g$ to about 900 $m^2/g$, or from about 600 $m^2/g$ to about 800 $m^2/g$, and an external surface area in the range from about 100 $m^2/g$ to about 500 $m^2g$, or from about 250 $m^2/g$ to about 400 $m^2/g$.

In some embodiments, the as-calcined molecular sieve material has a ratio of the external surface area to the total surface area of greater than or equal to 0.35 as measured by the BET Method.

Conveniently, the molecular sieve material in its as-calcined form has a composition comprising the molar relationship:

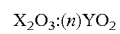

$$X_2O_3:(n)YO_2$$

wherein n is at least 30, X is a trivalent element, such as one or more of B, Al, Fe, and Ga, especially Al, and Y is a tetravalent element, such as one or more of Si, Ge, Sn, Ti, and Zr, especially Si.

In a second aspect, the invention resides in a molecular sieve material having, in its as-synthesized form, a particle size of less than 1.0 micron as measured by SEM, and an X-ray diffraction pattern including the following peaks in Table 2:

TABLE 2

| d-spacing (Å) | Relative Intensity [100 × I/I(o)] % |
|---|---|
| 17.3-16.4 | 1-10 |
| 11.8-11.3 | 60-100 |
| 11.1-10.7 | 60-100 |
| 10.7-10.3 | 30-100 |
| 8.58-8.34 | 30-80 |
| 4.21-4.15 | 10-40 |
| 4.17-4.11 | 5-30 |
| 4.07-4.01 | 10-40 |
| 3.951-3.899 | 60-100 |
| 3.922-3.871 | 10-40 |
| 3.832-3.784 | 50-90 |
| 3.737-3.691 | 10-40 |
| 3.704-3.659 | 10-40 |
| 3.677-3.632 | 5-30 |
| 3.537-3.496 | 10-40 |
| 2.077-2.063 | 5-30 |

In some embodiments, the as-synthesized molecular sieve material has a particle size in the range from 0.1 micron to 1.0 micron.

Conveniently, the molecular sieve material in its as-synthesized form has a composition comprising the molar relationship:

$$kF:mQ:(n)YO_2:X_2O_3$$

wherein 0≤k≤1.0, 0<m≤1.0, n is at least 30, F is fluoride, Q is an organic structure directing agent, X is a trivalent element and Y is a tetravalent element.

In some embodiments, X may be one or more of B, Al, Fe, Ga and Al, especially Al; and Y may be one or more of Si, Ge, Sn, Ti and Zr, especially Si.

Conveniently, Q comprises at least one of 1-methyl-4-(pyrrolidin-1-yl)pyridinium cations, 1-ethyl-4-(pyrrolidin-1-yl)pyridinium cations, 1-propyl-4-(pyrrolidin-1-yl)pyridinium cations, 1-butyl-4-(pyrrolidin-1-yl)pyridinium cations, and mixtures thereof.

In a third aspect, the invention resides in a method of making the molecular sieve material as described herein, the method comprising the steps of:

(a) preparing a synthesis mixture capable of forming said material, said mixture comprising water ($H_2O$), a source of hydroxyl ions ($OH^-$), a source of an oxide of a tetravalent element (Y), optionally a source of a trivalent element (X), optionally a source of said fluoride ions ($F^-$), and said organic structure directing agent (Q), wherein said synthesis mixture having a composition, in terms of mole ratios, in the following amounts and/or ranges:

| | |
|---|---|
| $YO_2/X_2O_3$ | at least 30; |
| $H_2O/YO_2$ | 2 to 100, or 4 to 50; |
| $OH^-/YO_2$ | 0.1 to 1; |
| $F/YO_2$ | 0 to 1; and |
| $Q/YO_2$ | 0.1 to 1; |

(b) removing water from said synthesis mixture under suitable freeze drying conditions to form a free-flowing powder of said synthesis mixture, said free-flowing powder having $H_2O/SiO_2$ molar ratio of less than 10;
(c) heating and optionally mixing said free-flowing powder of said synthesis mixture under crystallization conditions until said crystalline molecular sieve material is formed.

Conveniently, the suitable freeze drying conditions of the removing water step (b) include a temperature between −200° C. and 0° C. and a vacuum pressure less than 760 torr (101.3 kPa).

Conveniently, step (c) includes mixing under a cataracting mixing regime, preferably, such mixing being conducted in a ploughshare-type mixer.

Conveniently, the crystalline molecular sieve material may be recovered, and calcined to form the as-calcined molecular sieve, which in turn may be ion-exchanged with an acid so that the molecular sieve is in active form.

In a fourth aspect, the invention resides in an adsorbent comprising a crystalline molecular sieve material of this invention or a crystalline molecular sieve material in active form made by the method of this invention.

In a fifth aspect, the invention resides in a process for converting a feedstock comprising an organic compound to a conversion product which comprises contacting said feedstock at organic compound conversion conditions with a catalyst, said catalyst comprising an active form of the crystalline molecular sieve material of this invention. Alternatively, the crystalline molecular sieve material in active form is made by any one of the methods of this invention. Conveniently, the organic compound is one or more n-alkanes, and the conversion product comprises at least one or more iso-alkanes.

DETAILED DESCRIPTION

Figure 1:
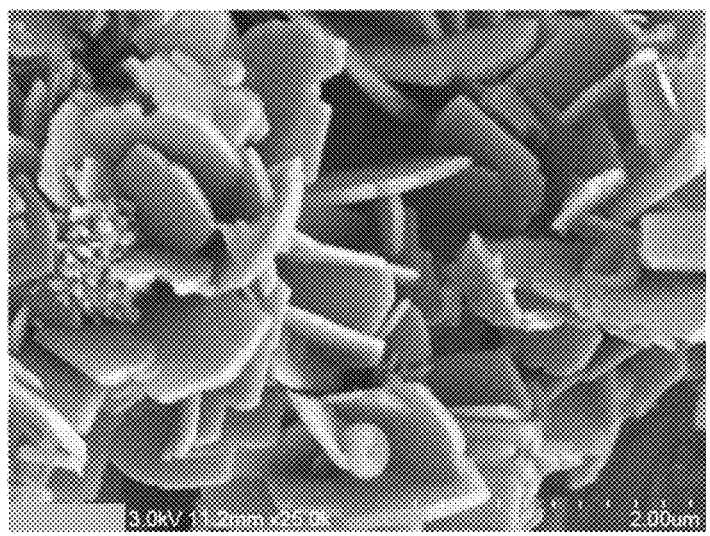
FIG. 1 shows a scanning electron microscope (SEM) images of comparative Example 1 (large particle EMM-17).

Definitions:

As used herein, the term "freeze drying" describes a process in which a solid or a slurry containing a solid is placed within a container and cooled or frozen before a vacuum is applied. The container is connected to one or more vacuum sources, and a vacuum (pressure less than 760 torr) is applied. The container is then maintained at or cooled below room temperature, preferably cooled at a temperature between −200° C. and 0° C. One method of cooling the container, which in turn cools the material in the container, may include placing the container in a liquid or gas coolant. Coolants that may be used include liquid nitrogen, liquid or solid carbon dioxide, organic refrigerants, e.g., fluorocarbon refrigerants. Water and/or other volatile components which may be present within the sieve or catalyst will typically be removed as a result of applying the vacuum conditions. The water, or other volatile material which may be present, is then removed from the container by way of the vacuum source. A source of heat to provide the heat of sublimation of water may also be needed, depending on the particular equipment and procedures used for freeze drying.

As defined herein, the term "cataracting mixing regime" when used to describe the mixing of a synthesis mixture comprised of a free-flowing powder means a mixing regime that is essentially a fluidized bed of particles (as described in Chapter 15 of the Handbook of Industrial Mixing. See, particularly, Sections 15-3.2.4 and 15-10.3.2). The blades are suspending and fluidizing the particles so that the particles are not touching each other and the particles are not agglomerating. It is believed that operating in this fluidized, cataracting regime creates free-flowing powder in the form of particularly small crystallites. Solids mixing under the "hurling and whirling principle" is operating under the cataracting mixing regime.

As defined herein, the term "free-flowing" means the ability of a powder to flow without anything stopping it.

As used herein, the term "BET" when used in connection with the surface area of a material is defined as the surface area as determined by ASTM Specification D 3663. Unless otherwise noted, the unit of measurement for surface area is in $m^2/g$.

As used herein, the term "particle size" refers to the "biggest dimension" of the particle as measured by scanning electron microscopy (SEM). In the case of substantially spherical particles, the biggest dimension of a particle will correspond to its diameter. In the case of rectangular particles, the biggest dimension of a particle will correspond to the diagonal of the rectangle drawn by the particle. When referring to the particle size of a population of particles, it should be understood that at least 90% of the particles by number have said biggest dimension.

As used herein, the term "ploughshare-type mixer" mean a mixer that operates in the cataracting mixing regime or the "hurling and whirling principle", which includes, but is not limited to the MDVT-22 laboratory mixer from Littleford Day (Florence, Ky.), described herein, or one of the ploughshare mixers from Gebrüder ödige Maschinenbau GmbH (Paderborn, Germany).

As used herein, the term "PyrrPyEt-OH" means 1-ethyl-4-pyrrolidinopyridinium hydroxide, the structure of which is shown as follows:

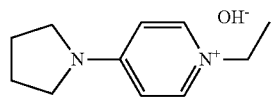

As used herein, the term "IUPAC Periodic Table" means the Periodic Table of the Elements of the International Union of Pure and Applied Chemistry, dated 1 May 2013, as it appears on the inside cover of The Merck Index, Twelfth Edition, Merck & Co., Inc., 1996.

Small Crystal EMM-17 Molecular Sieve Composition in As-Calcined Form

The first aspect of the invention is a small crystal molecular sieve material in its as-calcined form, designated as EMM-17, having a total surface area of greater than about 550 $m^2/g$ and/or an external surface area of greater than about 100 $m^2/g$ as measured by the BET Method.

Alternatively, the total surface area of the as-calcined EMM-17 molecular sieve material is in the range from about 550 $m^2/g$ to about 900 $m^2/g$, or in the range from about 600 $m^2/g$ to about 800 $m^2/g$, or in the range from about 700 $m^2/g$ to about 800 $m^2/g$, such as about 780 to about 800 $m^2/g$.

Alternatively, the external surface area of the as-calcined EMM-17 molecular sieve is greater than about 100 $m^2/g$, or in the range from about 100 $m^2/g$ to about 500 $m^2/g$, or in the range from about 250 $m^2/g$ to about 400 $m^2/g$, or in the range from about 300 $m^2/g$ to about 350 $m^2/g$, or about 320 to 330 $m^2/g$, such as about 325 $m^2/g$.

In a particular embodiment, the as-calcined molecular sieve has both a total surface area in the range from about 550 $m^2/g$ to about 900 $m^2/g$, or from about 600 $m^2/g$ to about 800 $m^2/g$, or from about 700 $m^2/g$ to about 800 $m^2/g$, and an external surface area in the range from about 100 $m^2/g$ to about 500 $m^2g$, or from about 250 $m^2/g$ to about 400 $m^2/g$, or from about 300 $m^2/g$ to about 350 $m^2/g$.

In one or more embodiments, the ratio of the external surface area to the total surface area of the as-calcined EMM-17 molecular sieve material is greater than or equal to 0.35 (or 35% when expressed as a percentage of 100%). Alternatively, the ratio of the external surface area to the total surface area of the as-calcined EMM-17 molecular sieve material is in the range of about 0.35 to about 0.50 (or about 35% to about 50% when expressed as a percentage of 100%), as measured by the BET Method.

The X-ray diffraction pattern of the as-calcined EMM-17 molecular sieve material includes the following peaks in Table 1:

TABLE 1

| d-spacing (Å) | Relative Intensity [100 × I/I(o)] % |
|---|---|
| 17.4-16.4 | 1-10 |
| 12.6-12.1 | 1-20 |
| 11.8-11.4 | 60-100 |
| 11.2-10.8 | 5-30 |
| 10.7-10.3 | 30-80 |
| 8.62-8.38 | 10-40 |
| 6.09-5.96 | 1-20 |
| 5.71-5.61 | 1-20 |
| 4.23-4.17 | 1-20 |
| 4.09-4.03 | 1-10 |
| 3.952-3.901 | 10-40 |
| 3.857-3.809 | 5-30 |
| 3.751-3.705 | 1-20 |
| 3.727-3.682 | 1-20 |
| 3.689-3.644 | 1-10 |
| 3.547-3.506 | 1-20 |

In one or more embodiments, in as-calcined form, the EMM-17 molecular sieve preferably has a particle size of less than 1.0 micron as measured by SEM, such as a particle size in the range from 0.1 micron to 1.0 micron.

In as-calcined form, the EMM-17 molecular sieve material may have a composition comprising the molar relationship:

$$X_2O_3:(n)YO_2$$

wherein n is at least 30, X is a trivalent element, such as one or more of B, Al, Fe, and Ga, especially Al, and Y is a tetravalent element, such as one or more of Si, Ge, Sn, Ti, and Zr, especially Si.

The molecular sieve of this invention may be used as an adsorbent. Alternatively, when the molecular sieve is particularly in its aluminosilicate form, it may be used as a catalyst to catalyze a wide variety of organic compound conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity. Examples of organic conversion processes which may be catalyzed by EMM-17 include cracking, hydrocracking, disproportionation, alkylation, and isomerization.

As in the case of many catalysts, it may be desirable to incorporate EMM-17 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with EMM-17, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with EMM-17 include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with EMM-17 also include inorganic oxides, such as silica, zirconia, titania, magnesia, beryllia, alumina, and mixtures thereof.

In addition to the foregoing materials, EMM-17 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of EMM-17 and inorganic oxide matrix may vary widely, with the EMM-17 content ranging from about 1 to about 98 or 99 percent by weight and more usually, particularly when the composite is prepared in the form of beads, in the range of about 50 to about 80 weight percent of the composite. EMM-17 can also be formulated without any binder as a 100% of the product.

Small Crystal EMM-17 Molecular Sieve Composition in as-Synthesized Form

The second aspect of the invention is a small crystal EMM-17 molecular sieve material in its as-synthesized form having a particle size of less than 1.0 micron as measured by SEM.

Alternatively, the particle size is in the range of 0.1 micron to 1 micron, or 0.1 micron to 0.75 micron, or 0.1 to 0.5 micron.

The X-ray diffraction pattern of the as-synthesized EMM-17 molecular sieve material includes the following peaks in Table 2:

TABLE 2

| d-spacing (Å) | Relative Intensity [100 × I/I(o)] % |
| --- | --- |
| 17.3-16.4 | 1-10 |
| 11.8-11.3 | 60-100 |
| 11.1-10.7 | 60-100 |
| 10.7-10.3 | 30-100 |
| 8.58-8.34 | 30-80 |
| 4.21-4.15 | 10-40 |
| 4.17-4.11 | 5-30 |
| 4.07-4.01 | 10-40 |

TABLE 2-continued

| d-spacing (Å) | Relative Intensity [100 × I/I(o)] % |
| --- | --- |
| 3.951-3.899 | 60-100 |
| 3.922-3.871 | 10-40 |
| 3.832-3.784 | 50-90 |
| 3.737-3.691 | 10-40 |
| 3.704-3.659 | 10-40 |
| 3.677-3.632 | 5-30 |
| 3.537-3.496 | 10-40 |
| 2.077-2.063 | 5-30 |

In as-synthesized form, the EMM-17 molecular sieve material has a composition comprising the molar relationship:

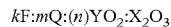

$kF:mQ:(n)YO_2:X_2O_3$ wherein $0 \leq k \leq 1.0$, $0 < m \leq 1.0$, n is at least 30, F is fluoride, Q is an organic structure directing agent, X is a trivalent element, such as one or more of B, Al, Fe, Ga, especially Al, and Y is a tetravalent element, such as one or more of Si, Ge, Sn, Ti, and Zr, especially Si.

The structure directing agent, Q, comprises at least one of 1-methyl-4-(pyrrolidin-1-yl)pyridinium cations, 1-ethyl-4-(pyrrolidin-1-yl)pyridinium cations, 1-propyl-4-(pyrrolidin-1-yl)pyridinium cations, 1-butyl-4-(pyrrolidin-1-yl)pyridinium cations, and mixtures thereof. The counter anion of the structure directing agent is preferably a hydroxide anion.

Method of Making Small Crystal EMM-17 Molecular Sieve

The third aspect of the invention is a method of making the small crystal EMM-17 molecular sieve material, as described herein. The method comprises the following steps. In step (a), a synthesis mixture capable of forming said material is prepared. The mixture comprises water ($H_2O$), a source of hydroxyl ions ($OH^-$), a source of an oxide of a tetravalent element (Y), optionally a source of a trivalent element (X), optionally a source of fluoride ions ($F^-$), mentioned above, and an organic structure directing agent (Q), which is defined above.

The source of hydroxyl ion is not particularly limited. Such source, for example, may be a hydroxide of Group 1 earth metal or a Group 2 alkaline earth metal of the IUPAC Periodic Table. Another example of a source of hydroxyl ion, an anion, is a counter anion to the organic structure directing agent.

The source of oxide of the tetravalent element is not particularly limited. Such source, for example, may be silicon dioxide or germanium oxide.

The source of fluoride ions ($F^-$) is not particularly limited. Such source of fluoride ions include, but is not limited to said source of fluoride (F) ions is one or more of HF, $NH_4F$, and $NH_4HF_2$, for example, particularly, ammonium fluoride ($NH_4F$).

The synthesis mixture has a composition, in terms of mole ratios, in the following amounts and/or ranges:

| | |
| --- | --- |
| $YO_2/X_2O_3$ | at least 30; |
| $H_2O/YO_2$ | 2 to 100, or 4 to 50; |
| $OH^-/YO_2$ | 0.1 to 1; |
| $F/YO_2$ | 0 to 1; and |
| $Q/YO_2$ | 0.1 to 1. |

In step (b), water is removed from said synthesis mixture under suitable freeze drying conditions to form a free-flowing powder of said synthesis mixture. The suitable freeze drying conditions for removing water include a temperature between −200° C. and 0° C. and a vacuum pressure less than 760 torr (101.3 kPa).

In some embodiments, the free-flowing powder exiting the freeze-drying apparatus has a $H_2O/SiO_2$ molar ratio of less than 10, or less than 5, or preferably, less than 4. In embodiments where the $H_2O/SiO_2$ molar ratio of said synthesis mixture is less than the desirable range of 1 to 10, water ($H_2O$) is added to free-flowing powder to reach the target range of the $H_2O/YO_2$ molar ratio of 1 to 10.

In some embodiments of the invention, the freeze-dried synthesis mixture exits the freeze-drying apparatus as an agglomeration of particles. Such agglomeration of particles are reduced to a free-flowing powder, by application of blending or grinding apparatus, for example, to break the agglomeration to form the free-flowing powder of the synthesis mixture.

In step (c), the free-flowing powder of the synthesis mixture is heated and optionally mixed under crystallization conditions until said crystalline molecular sieve material, the designated small crystal EMM-17, is formed. Suitable crystallization conditions include a temperature in the range of 100° C. to 250° C., preferably a temperature in the range of from about 180° C. to 200° C. In a preferred embodiment, the free-flowing powder is both heated and mixed, either concurrently or sequentially or alternatingly, until the crystalline molecular sieve material of this invention is formed.

In one or more embodiments, step (c) includes mixing under a cataracting mixing regime, as described. The agitated mixer for use in the method of this invention is not particularly limited so long as the mixing is in the cataracting mixing regime. Preferably, such mixing is conducted in an agitated mixer, and most preferably, a ploughshare-type mixer.

Not to be bound by theory, it is believed that the introduction of the freeze-dried synthesis mixture and its low molar water content coupled with a cataracting mixing regime in an agitated mixer enable the crystallization to create a uniformly small crystal of high purity. It is believed that under these conditions, inconsistent heating due to hot spots and inconsistent crystallization which favors non-uniform and large crystal growth are minimized.

As described in Chapter 15 of the Handbook of Industrial Mixing by Fernando J. Muzzio et al. and Konanur Manjunath et al., an agitated mixer uses mechanical means (e.g., paddles, plows, and ribbons) to create mixing action while keeping the shell stationary. A typical agitated mixer consists of a stationary shell (vertical or horizontal) with a single or twin shafts on which agitating devices are mounted. During mixing, particles are thrown randomly and the product is sheared or fluidized mechanically, depending on the tip speed of the paddles or plows. While mixing is taking place, one can incorporate a liquid injection for further agglomeration and choppers or delumpers for breaking up the agglomeration, depending on the requirement. These mixers can handle a wide range of bulk solids from free-flowing powders to cohesive pastes. In agitating mixers, the mixing is predominantly due to particles moving randomly from one point to the other, along with the bulk mass. So there is a combination of both shear and convection occurring within the mixer. In a paddle or plow mixer, the mixer typically has a single or double U-shaped trough with an impeller that consists of a single shaft or twin shafts mounted with to plows/paddles at regular pitch in between. The plow helps to lift the solids creating chaotic motion causing shear in the powder mass that results in mixing. The motion of the powder in the mixer results in convective mixing whose intensity is proportional to the tip speed of the impeller. At lower speeds, which is called cascading, the powder is carried by rotation and descends by rolling and/or sliding along the surfaces of the solids mass just as in tumbling mixers. At medium speeds, which is called cataracting, the powder is carried by the plow and drops either by sliding, rolling, or cascading. At higher speeds, which is called the equilibrium regime, the powder is mostly lifted by the plow and slides off at the end, where there is hardly any chance for rolling, or shearing, and the desired mixing level will not be promoted. For more details, see Chapter 15-10.3.2 by Fernando J. Muzzio et al. and Konanur Manjunath et al., of the Handbook of Industrial Mixing (John Wiley & Sons 2004), Edited by Edward L. Paul, Victor A. Atiemo-Obeng, and Suzanne M. Kresta (ISBN 0-471-26919-0).

In one or more of the embodiments of this invention, the crystalline molecular sieve material when it is not a free-flowing powder may be separated from the synthesis mixture by any suitable means (e.g., vacuum filtration) to recover the as-synthesized molecular sieve that still retains a portion of the organic structure directing agent (Q). The as-synthesized material is typically combined with a binder and formulated, and then calcined and ion-exchanged to form an active catalyst. The formulated, as-synthesized material calcined, by suitable means known in the art and such as exemplified in the Examples, to remove the organic structure directing agent and form the as-calcined molecular sieve. After calcination, the as-calcined molecular sieve may be ion-exchanged with an ammonium salt, such as, for example, ammonium sulfate, ammonium chloride, ammonium bromide or ammonium nitrate by suitable means known in the art and such as exemplified in the Examples, to form the molecular sieve in active form.

Adsorbent

The fourth aspect of the invention is an adsorbent comprising a crystalline molecular sieve material (i.e., EMM-17) of this invention or a crystalline molecular sieve material in active form made by the method of this invention. The adsorbent which employs such crystalline molecular sieve, may be incorporated with another material resistant to the temperatures and other conditions employed in adsorption processes. Such materials include active and inactive materials and synthetic or naturally occurring zeolites as well as inorganic materials such as clays, silica and/or metal oxides such as alumina, such as those described above with respect to the small crystal EMM-17 composition.

Hydrocarbon Conversion Process Using Small Crystal EMM-17

The fifth aspect of the invention resides is a process for converting a feedstock comprising an organic compound to a conversion product. The process comprises the step of contacting said feedstock at organic compound conversion conditions with a catalyst to form a conversion product. The catalyst comprises an active form of the crystalline molecular sieve material of this invention. Alternatively, the crystalline molecular sieve material in active form is made by any one of the methods of this invention. Conveniently, the organic compound is one or more n-alkanes, and the conversion product comprises at least one or more iso-alkanes.

EXAMPLES

The invention will now be more particularly described with reference to the following non-limiting Examples and the accompanying drawings.

Experimental Methods

Measurement of Total Surface Area and External Surface Area by BET Method

The total BET surface area and the t-Plot micropore surface area were measured by nitrogen adsorption/desorption with a Micromeritics Tristar II 3020 instrument (Micromeritics Corporation, Norcross, Ga.) instrument after degassing of the calcined zeolite powders for 4 hours at 350° C. in air. The external surface area was obtained by the subtraction of the t-plot micropore surface area from the total BET surface area. The ratio of the external surface area over the total BET Surface area ratio was calculated from the t-plot generated as part of the BET determination by nitrogen sorption. More information regarding the method can be found, for example, in "Characterization of Porous Solids and Powders: Surface Area, Pore Size and Density", S. Lowell et al., Springer, 2004.

X-Ray Diffraction Patterns

The X-ray diffraction data (powder XRD or XRD) were collected with a Bruker D4 Endeavor diffraction system with a VANTEC multichannel detector using copper K-alpha radiation. The diffraction data were recorded by scanning mode with 0.018 degrees two-theta, where theta is the Bragg angle, and using an effective counting time of about 30 seconds for each step.

SEM Images and Crystal Size

The SEM images were obtained on a HITACHI S4800 Field Emission Scanning Electron Microscope.

The crystal size measured in the Examples were determined by averaging the size of multiple crystals as shown in the SEM.

Examples 1 to 7

In Examples 1 to 7, the synthesis of EMM-17 crystal was investigated under various agitation schemes during crystallization.

Comparative Example 1

Large Crystal EMM 17

EMM-17 was produced by making a gel with the following composition and gently evaporating said composition to remove all excess water.
The following reagents shown in Table 3 were added to a beaker:

TABLE 3

| Reagent | Amount (grams) |
|---|---|
| Ultrasil-VN3PM-Modified | 10.5 |
| $Al_2(SO_4)_3$ (47% solution) | 1.9 |
| PyrrPyEt—OH, 20% | 77.3 |
| 98% $NH_4F$ | 3.1 |

The gel was evaporated with flowing $N_2$ while stirring for about 72 hours to remove essentially all the free water. The dried gel was ground to a powder and then re-hydrated to the target $H_2O/SiO_2$ molar ratio of 4 by adding about 5.6 grams of $H_2O$. This gel was charged to a standard Parr autoclave, the fill level being slightly above the bottom blade. The gel was agitated slowly at 320° F. (160° C.) for 10 days. The resulting product showed a mixture of large crystal EMM-17, as shown in FIG. 1, and confirmed to be EMM-17 via X-ray diffraction (XRD), XRD not shown.

Examples 2 to 7

Synthesis Mixture Preparation

The following reactants shown in Table 4 were mixed, in order, and charged to trays that are suitable for large-scale freeze drying, as follows:

TABLE 4

| Reagent | Amount (grams) |
|---|---|
| Ultrasil-VN3PM-Modified | 300 |
| $Al_2(SO_4)_3$ (47% solution) | 50 |
| PyrrPyEt—OH, 20% | 2210 |
| 98% $NH_4F$ | 86.2 |

The synthesis mixture as a gel was freeze dried for approximately 16 hours, until the material was a dry powder. This powder was ground to a free-flowing powder, and stored for subsequent crystallizations. For each crystallization, enough water was added to the powder, depending upon the reaction volume, to re-hydrate the powder to the target $H_2O/SiO_2$ molar ratio of 4. The re-hydrated powder remained as a free-flowing powder, and was used in the synthesis of Examples 2 to 6.

Example 2

Figures 2A, 2B:
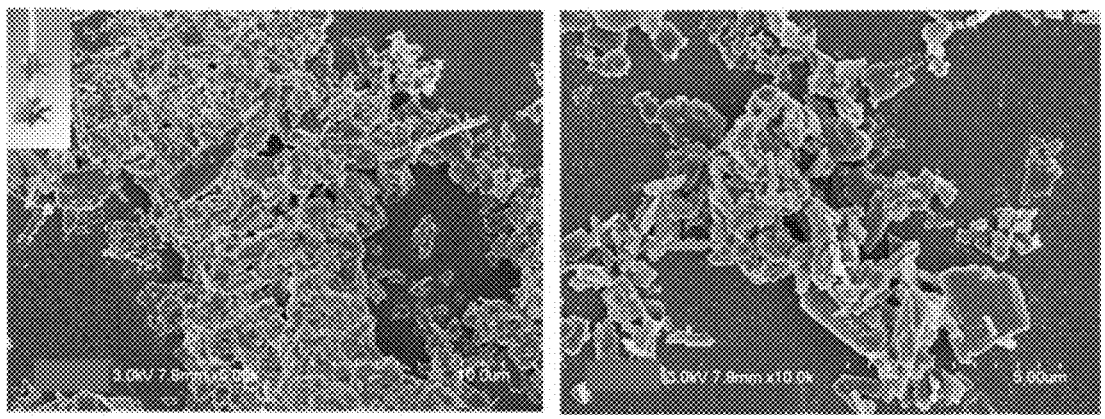
FIGS. 2A and 2B show SEM images of Example 2.

The free-flowing powder of the freeze dried synthesis mixture was crystallized in a standard Parr Autoclave, the fill level being slightly above the bottom blade using a stacked agitation system. The stacked agitator is shown in the inset of FIG. 2A. The gel was agitated slowly at 320° F. (160° C.) for 10 days. This method produced EMM-17 crystals with a mixed morphology and amorphous material, as shown in the SEMs in FIGS. 2A and 2B.

Example 3

Figures 3A, 3B:
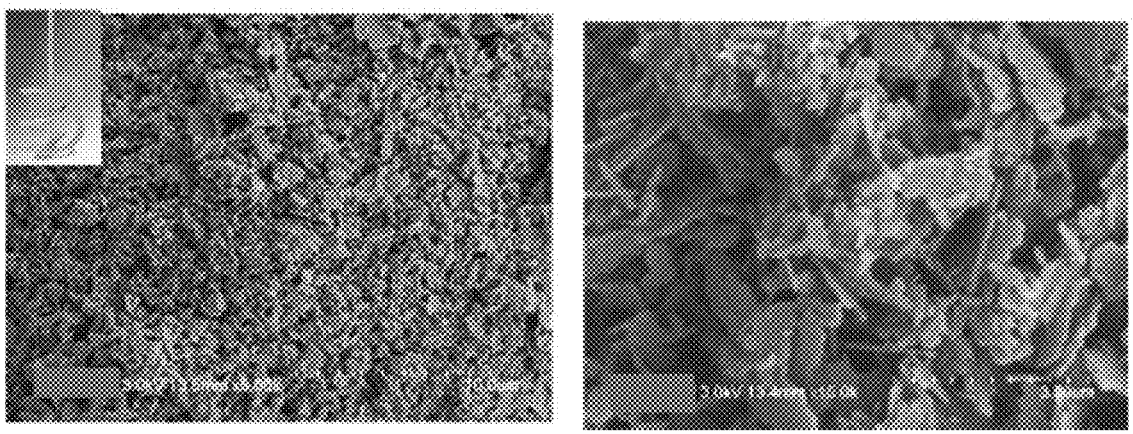
FIGS. 3A and 3B show SEM images of Example 3.

The free-flowing powder of the freeze dried synthesis mixture was crystallized in a standard Parr Autoclave, the fill level being slightly above the bottom blade using a spiral agitation system. The spiral agitator is shown in the inset of FIG. 3A. The gel was agitated slowly at 320° F. (160° C.) for 10 days. This method produced EMM-17 crystals with a more uniform morphology than Example 2 in addition to amorphous material, as shown in the SEMs in FIGS. 3A and 3B. The EMM-17 crystals were large, plate-like crystals ~3 μm×0.5 μm (particle size ~3 μm).

Example 4

Figure 4:
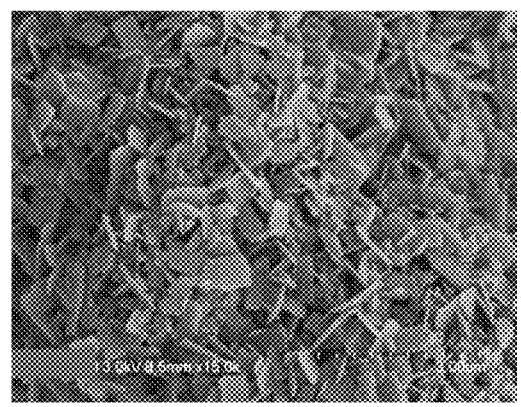
FIG. 4 shows an SEM image of Example 4.

The free-flowing powder of the freeze dried synthesis mixture (25 grams) was charged to a basket and inserted into a standard Parr Autoclave; i.e., to create a static environment, and then crystallized at 320° F. (160° C.) for 10 days. This method produced pure EMM-17 crystals. The volume of the synthesis mixture was small and the resulting product was very uniform flake-like crystals of about 1 μm×0.1 μm in size, as shown in the SEM in FIG. 4 (particle size ~1 μm).

Example 5

Figure 5:
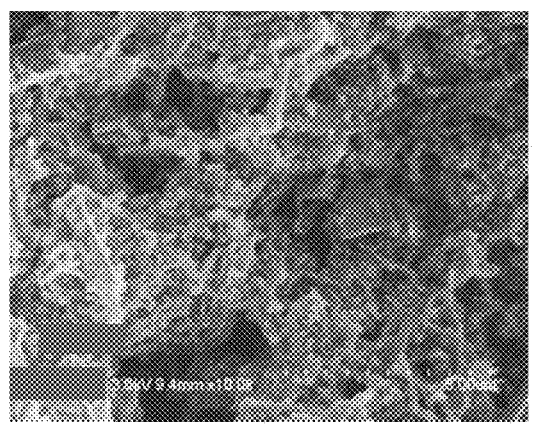
FIG. 5 shows an SEM image of Example 5.

The free-flowing powder of the freeze dried synthesis mixture (300 grams) was charged to a basket and inserted into a standard Parr Autoclave; i.e., to create a static environment, and then crystallized at 320° F. (160° C.) for 10 days. This method produced pure EMM-17 crystals. The volume of the synthesis mixture was relatively large (as compared to Example 4) and the resulting product was crystalline; however, with a non-uniform morphology, as shown in the SEM in FIG. 5.

Example 6

Figure 6:
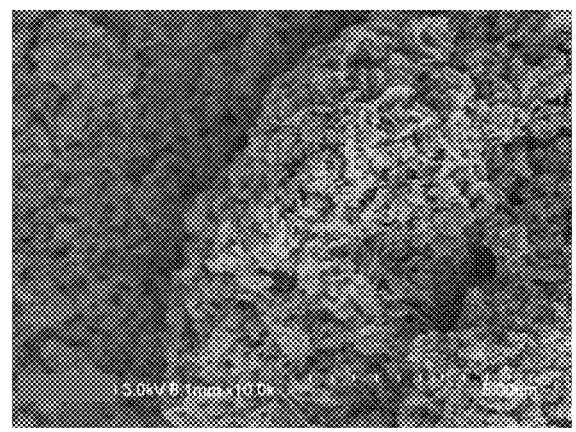
FIG. 6 shows an SEM image of Example 6.

The free-flowing powder of the freeze dried synthesis mixture (1520 grams) was charged to a ploughshare-type mixer (Model M/DVT-22, obtainable from Littleford Day, Florence, Ky.) and crystallized while heating and agitating under a cataracting mixing regime at a shaft rotational speed of 50 RPM. The product was crystalline as small particle, pure phase EMM-17 of about 0.1 to 0.5 μm in size, as shown in the SEM in FIG. 6.

Figure 7:
FIG. 7 shows an SEM image of Example 7.

(602 grams). This powder was ground to a free-flowing powder, and then 140 g of water was added to re-hydrate to the target $H_2O/SiO_2$ molar ratio of 4. The re-hydrated powder mixture was thoroughly homogenized for approximately 5 min in a FlackTek SpeedMixer and then charged to a 2 liter PARR horizontal autoclave, and mixed and reacted for 14 days at 160° C. The product was recovered by vacuum filtration, washed with deionized water, and then dried in 115° C. air. Analysis by powder XRD showed the sample to be pure EMM-17 (XRD not shown). The yield was 256 grams. The elemental analysis by ICP-AES gave 1.24% $Al_2O_3$, 74.8% $SiO_2$ (Si/Al=51 molar), 0.19% Cr, 0.15% Ni, and 0.97% Fe. The SEM, showed in FIG. 7, revealed crystals of ~0.5 μm plates and of <0.1 μm thickness (particle size ~0.5 μm).

A summary of properties exhibited by these Examples, in Table 6 below, show the impact of agitation schemes on the purity and crystal size of the product. It is noted that in Example 6, the EMM-17 material produced from the ploughshare-type mixer (obtainable from Littleford-Day), was exceptionally small, as indicated by the high surface area and the high external surface area, measured using the procedures outlined in ASTM D3663 multi-point BET surface area.

TABLE 6

| Example No. | Synthesis Gel Preparation Method | BET-Total Surface Area ($m^2/g$) | Micropore Surface Area ($m^2/g$) | External Surface Area ($m^2/g$) | Ratio of External/Total Surface Area (×100%) | Micropore Volume (cc/g) |
|---|---|---|---|---|---|---|
| 1 (Comparative, Large Crystal EMM-17) | Evaporation; Standard Autoclave; bottom blades | 550 | 520 | 22 | 4.0% | 0.203 |
| 2 | Freeze dried gel; Std. Autoclave, stacked blades | 388 | 375 | 13 | 3.3% | 0.15 |
| 3 | Freeze dried gel; Std. Autoclave, spiral agitator | 310 | 287 | 23 | 7.4% | 0.11 |
| 4 | Freeze dried gel; static small scale | 537 | 495 | 42 | 7.8% | 0.19 |
| 5 | Freeze dried gel; static large scale | 562 | 466 | 96 | 17.1% | 0.19 |
| 6 | Freeze dried gel; ploughshare-type mixer | 790 | 465 | 324 | 41.0% | 0.20 |
| 7 | Freeze dried gel; PARR horizontal autoclave mixer | 509 | 484 | 25 | 4.9% | 0.19 |

Example 7

The following reactants shown in Table 5 were mixed, in order, and charged to trays that are suitable for large-scale freeze drying, as follows:

TABLE 5

| Reagent | Amount (grams) |
|---|---|
| Ultrasil-VN3PM-Modified | 265.4 |
| $Al(NO_3)_3 \cdot 9H_2O$ | 30.7 |
| PyrrPyEt—OH, 20.4% | 1950 |
| 30% $NH_4F$ | 252.8 |

The synthesis mixture as a gel was freeze dried for approximately 2 days, until the material was a dry powder All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A crystalline molecular sieve material having, in its as-synthesized form, a particle size of less than 1.0 micron as measured by SEM, and an X-ray diffraction pattern including the following peaks in Table 2:

TABLE 2

| d-spacing (Å) | Relative Intensity [100 × I/I(o)] % |
|---|---|
| 17.3-16.4 | 1-10 |
| 11.8-11.3 | 60-100 |
| 11.1-10.7 | 60-100 |
| 10.7-10.3 | 30-100 |
| 8.58-8.34 | 30-80 |
| 4.21-4.15 | 10-40 |
| 4.17-4.11 | 5-30 |
| 4.07-4.01 | 10-40 |
| 3.951-3.899 | 60-100 |
| 3.922-3.871 | 10-40 |
| 3.832-3.784 | 50-90 |
| 3.737-3.691 | 10-40 |
| 3.704-3.659 | 10-40 |
| 3.677-3.632 | 5-30 |
| 3.537-3.496 | 10-40 |
| 2.077-2.063 | 5-30. |

2. The crystalline molecular sieve material of claim 1 having a composition comprising the molar relationship:

$kF:mQ:(n)YO_2:X_2O_3$, wherein $0 \le k \le 1.0$, $0 < m \le 1.0$, n is at least 30, F is a source of fluoride, Q is an organic structure directing agent, X is a trivalent element and Y is a tetravalent element.

3. The crystalline molecular sieve material of claim 2, wherein X includes one or more of B, Al, Fe, and Ga and Y includes one or more of Si, Ge, Sn, Ti, and Zr.

4. The crystalline molecular sieve material of claim 2, wherein X is aluminum and Y is silicon.

5. The crystalline molecular sieve material of claim 2, wherein Q is selected from the group consisting of 1-methyl-4-(pyrrolidin-1-yl)pyridinium cations, 1-ethyl-4-(pyrrolidin-1-yl)pyridinium cations, 1-propyl-4-(pyrrolidin-1-yl)pyridinium cations, 1-butyl-4-(pyrrolidin-1-yl)pyridinium cations and mixtures thereof.

6. A crystalline molecular sieve material having, in its as-calcined form, a total surface area of greater than 550 $m^2/g$ and/or an external surface area of greater than 100 $m^2/g$ as measured by the BET Method, and an X-ray diffraction pattern including the following peaks in Table 1:

TABLE 1

| d-spacing (Å) | Relative Intensity [100 × I/I(o)] % |
|---|---|
| 17.4-16.4 | 1-10 |
| 12.6-12.1 | 1-20 |
| 11.8-11.4 | 60-100 |
| 11.2-10.8 | 5-30 |
| 10.7-10.3 | 30-80 |
| 8.62-8.38 | 10-40 |
| 6.09-5.96 | 1-20 |
| 5.71-5.61 | 1-20 |
| 4.23-4.17 | 1-20 |
| 4.09-4.03 | 1-10 |
| 3.952-3.901 | 10-40 |
| 3.857-3.809 | 5-30 |
| 3.751-3.705 | 1-20 |
| 3.727-3.682 | 1-20 |
| 3.689-3.644 | 1-10 |
| 3.547-3.506 | 1-20. |

7. The crystalline molecular sieve material of claim 6 and having a composition comprising the molar relationship:

$(n)YO_2:X_2O_3$, wherein n is at least 30, X is a trivalent element, and Y is a tetravalent element.

8. The crystalline molecular sieve material of claim 7, wherein X includes one or more of B, Al, Fe, and Ga and Y includes one or more of Si, Ge, Sn, Ti, and Zr.

9. The crystalline molecular sieve material of claim 7, wherein X is aluminum and Y is silicon.

10. The crystalline molecular sieve material of claim 6, wherein the ratio of the external surface area to the total surface area of said as-calcined crystalline molecular sieve is greater than or equal to 0.35 as measured by the BET Method.

11. A method of making said crystalline molecular sieve material of claim 6, the method comprising the steps of:
(a) preparing a synthesis mixture capable of forming said material, said mixture comprising water ($H_2O$), a source of hydroxyl ions ($OH^-$), a source of an oxide of a tetravalent element (Y), optionally a source of a trivalent element (X), optionally a source of said fluoride ions ($F^-$), and said organic structure directing agent (Q), wherein said synthesis mixture has a composition, in terms of mole ratios, in the following amounts and/or ranges:

| | |
|---|---|
| $YO_2/X_2O_3$ | at least 30; |
| $H_2O/YO_2$ | 2 to 100, or 4 to 50; |
| $OH^-/YO_2$ | 0.1 to 1; |
| $F/YO_2$ | 0 to 1; and |
| $Q/YO_2$ | 0.1 to 1; |

(b) removing water from said synthesis mixture under suitable freeze drying conditions to form a free-flowing powder of said synthesis mixture, said free-flowing powder having a $H_2O/SiO_2$ molar ratio of less than 10;
(c) heating and optionally mixing said free-flowing powder of said synthesis mixture under crystallization conditions until said crystalline molecular sieve material is formed.

12. The method of claim 11, wherein said suitable freeze drying conditions of step (b) include a temperature between −200° C. and 0° C. and a vacuum pressure less than 760 torr (101.3 kPa).

13. The method of claim 11, wherein step (c) comprises both heating and mixing said free-flowing powder of said synthesis mixture.

14. The method of claim 11, wherein said step (b) includes grinding the freeze-dried synthesis mixture to form said free-flowing powder.

15. The method of making said crystalline molecular sieve material of claim 11, wherein water ($H_2O$) is added to said free-flowing powder of said synthesis mixture so that said $H_2O/YO_2$ molar ratio in the range of 1 to 10.

16. The method of claim 11, wherein step (c) includes mixing under a cataracting mixing regime.

17. The method of claim 16, wherein said step (c) is conducted in a ploughshare-type mixer.

18. The method of claim 11, wherein said crystallization conditions include a temperature in the range of 100° C. to 250° C.

19. The method of claim 11, wherein said source of fluoride (F) ions is one or more of HF, $NH_4F$, and $NH_4HF_2$.

20. The method of claim 11, further comprising the steps of:
(d) recovering said crystalline molecular sieve material from step (c);
(e) calcining said crystalline molecular sieve material to remove the organic structure directing agent (Q) to form said crystalline molecular sieve material in as-calcined form.

21. The method of claim 20, further comprising the step of:
(f) ion-exchanging said crystalline molecular sieve material in as-calcined form with an ammonium salt.

22. An adsorbent comprising a crystalline molecular sieve material of claim 1 or a crystalline molecular sieve material made by the method of claim 21.

23. A process for converting a feedstock comprising an organic compound to a conversion product which comprises contacting said feedstock at organic compound conversion conditions with a catalyst, said catalyst comprising an active form of a crystalline molecular sieve material of claim 1 or a crystalline molecular sieve material made by the method of claim 20.

* * * * *